(12) United States Patent
Chene et al.

(10) Patent No.: US 8,939,575 B2
(45) Date of Patent: Jan. 27, 2015

(54) SPECTACLES FRAME WITH TELESCOPIC HINGES AND OFFSET SPRING

(76) Inventors: Richard Chene, Neuilly (FR); Alain Miklitarian, Paris (FR); Olivier Rodi, Gambais (FR); Dominique Delamour, Les Mesnuls (FR)

( * ) Notice: Subject to any disclaimer, the term of this patent is extended or adjusted under 35 U.S.C. 154(b) by 100 days.

(21) Appl. No.: 13/809,118

(22) PCT Filed: Jul. 8, 2011

(86) PCT No.: PCT/EP2011/061701
§ 371 (c)(1),
(2), (4) Date: May 21, 2013

(87) PCT Pub. No.: WO2012/004405
PCT Pub. Date: Jan. 12, 2012

(65) Prior Publication Data
US 2013/0235326 A1    Sep. 12, 2013

(30) Foreign Application Priority Data

Jul. 9, 2010 (FR) ..................................... 10 02908

(51) Int. Cl.
*G02C 5/22* (2006.01)
*G02C 5/14* (2006.01)

(52) U.S. Cl.
CPC .............. *G02C 5/2236* (2013.01); *G02C 5/143* (2013.01); *G02C 5/2227* (2013.01); *G02C 2200/26* (2013.01)
USPC .............................. 351/113; 351/153; 16/228

(58) Field of Classification Search
USPC ..................... 351/113, 153, 114, 111; 16/228
See application file for complete search history.

(56) References Cited

U.S. PATENT DOCUMENTS 6,381,807 B1    5/2002  Hsu
6,910,247 B1 *  6/2005  Tabacchi ........................ 16/228

FOREIGN PATENT DOCUMENTS

| DE | 102 47 604 A1 | 5/2004 |
|---|---|---|
| FR | 2 517 080 A1 | 5/1983 |
| WO | WO 98/33087 A1 | 7/1998 |

OTHER PUBLICATIONS

International Search Report of PCT/EP2011/081701, mailed Aug. 2, 2011, 11 pages.
Search Report and Opinion of French Patent Application No, 1002908, mailed Mar. 11, 2011, 8 pages.

* cited by examiner

*Primary Examiner* — Hung Dang
(74) *Attorney, Agent, or Firm* — Klein, O'Neill & Singh, LLP

(57) ABSTRACT

The spectacle frame includes a frame front extended by two lateral tenons and two sides articulated to the tenons about articulation pins of two telescopic hinges, each with a frame front element fastened to a tenon and a side element fastened to a side, the side element of a hinge including a slide articulated to the frame front element and slidably mounted in a sheath against and subject to the action of a spring. The slide extends as far as the free end of the side, of tubular shape and providing said sheath, a sleeve, fixed to the end of the slide, being slidably mounted in the end of the side in which said spring also extends to cooperate with the sleeve.

8 Claims, 4 Drawing Sheets

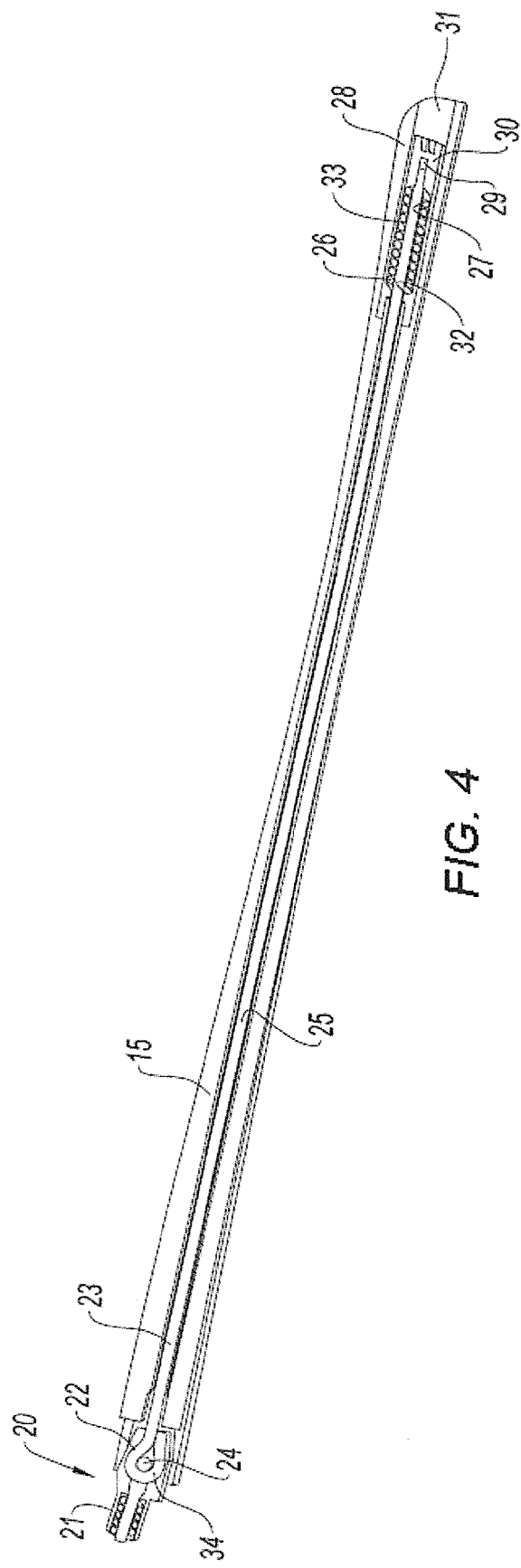

SPECTACLES FRAME WITH TELESCOPIC HINGES AND OFFSET SPRING

This is a U.S. National Phase of PCT/EP2011/061701, filed Jul. 8, 2011, which claims the benefit of priority to FR 1002908, filed Jul. 9, 2010, which is incorporated herein by reference.

FIELD OF THE INVENTION

The field of the invention is that of spectacle frames.

BACKGROUND OF THE INVENTION

A spectacle frame includes a frame front face and two sides each articulated to a lateral tenon on the frame front face via a hinge.

In the open position, a spectacle side extends substantially at a right angle from the general plane of the frame front face.

A telescopic hinge enables the side to be opened beyond this right angle. Thanks to this "over-opening" it assures greater comfort when the frame is on the nose and prevents the risk of damaging or deforming the frame and the sides.

A spectacle frame telescopic hinge generally includes a spring that presses the side against the head but is precisely what enables the over-opening.

A telescopic hinge generally includes two elements assembled on an articulation pin and respectively fastened to a frame front tenon (frame front element) and a side (side element), more particularly the shank of the side which is the core on which the side is formed when this core does not in itself from the side. The hinge may equally be fixed directly to the side, even when it includes a shank, the fixing being operative at the end of the side that is also called the side tenon.

The side element fastened to the side includes a slide mounted, on the one hand, on the articulation pin and, on the other hand, in a sheath fastened to the core or to the side itself. The slide slides in the sheath against and subject to the action of a spring, generally a compression spring, also extending inside the sheath.

In frames of the type outlined above, the side hinges, because of the presence of the spring, are therefore relatively bulky and heavy. Moreover, and again because of this fact, at the level of the hinges the sides are relatively thick. All this contributes to increasing the weight of the frame in the region of the frame front face, which is not conducive to comfort, notably for the nose of users which is marked by the bridge that joins the two frame front face parts supporting the lenses.

It is this problem that the applicants have sought to solve by proposing their invention.

SUMMARY OF THE INVENTION

To this end, the invention concerns a spectacle frame including a frame front face extended by two lateral tenons and two sides articulated to the tenons about articulation pins of two telescopic hinges, each with a frame front element fastened to a tenon and a side element fastened to a side, the side element of a hinge including a slide articulated to the frame front element and slidably mounted in a sheath against and subject to the action of a spring, which frame is characterized in that the slide of a side hinge extends as far as the free end of the side, of tubular shape and providing said sheath, a sleeve, fixed to the end of the slide, being slidably mounted in the end of the side in which said spring also extends to cooperate with the sleeve.

Thanks to the invention, and the hinge spring being offset in the free end of the side, part of the mass that was at the front, in the hinge, has been transferred to the back, in the end of the side, which reduces the weight pressing down on the nose of the user and improves comfort.

Moreover, if, as in the preferred embodiment, the side end is open and blocked by the sleeve that is removable, the spring being at this end, it is easily accessible to be replaced by another, possibly of different shape.

It is advantageous if end of the slide is externally threaded and the sleeve is internally threaded and screwed to the slide.

The sheath in the side preferably includes, at the end of the side, an enlarged portion in which the spring extends and having a bottom on which the spring bears.

BRIEF DESCRIPTION OF THE DRAWING

The invention will be better understood in the light of the following description of a preferred embodiment of the frame of the invention given with reference to the appended drawing in which:

FIG. 4 is a view in section of the temple from FIG. 2.

DETAILED DESCRIPTION OF A PREFERRED EMBODIMENT

Figure 1:
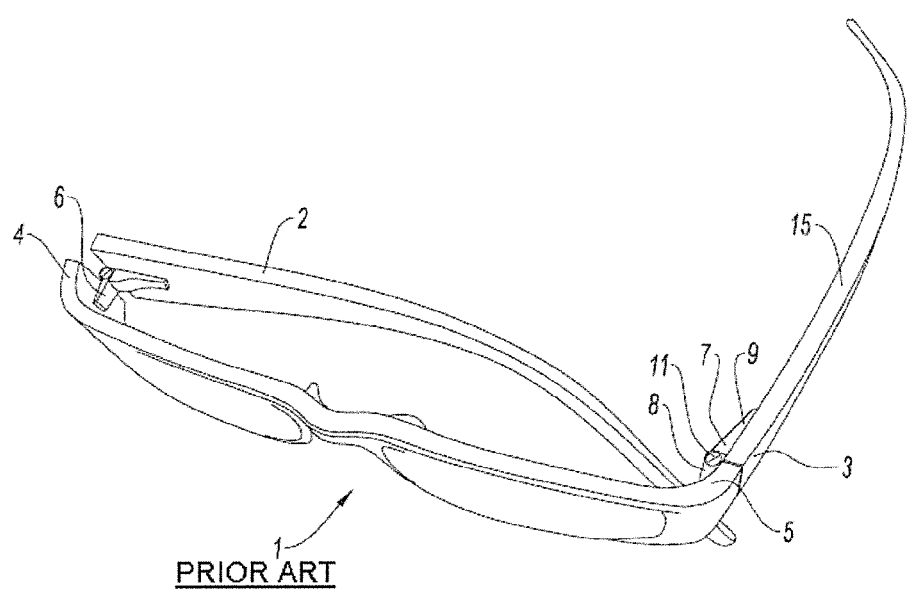
FIG. 1 is a perspective view from above of a classic spectacle frame.
Figure 2:
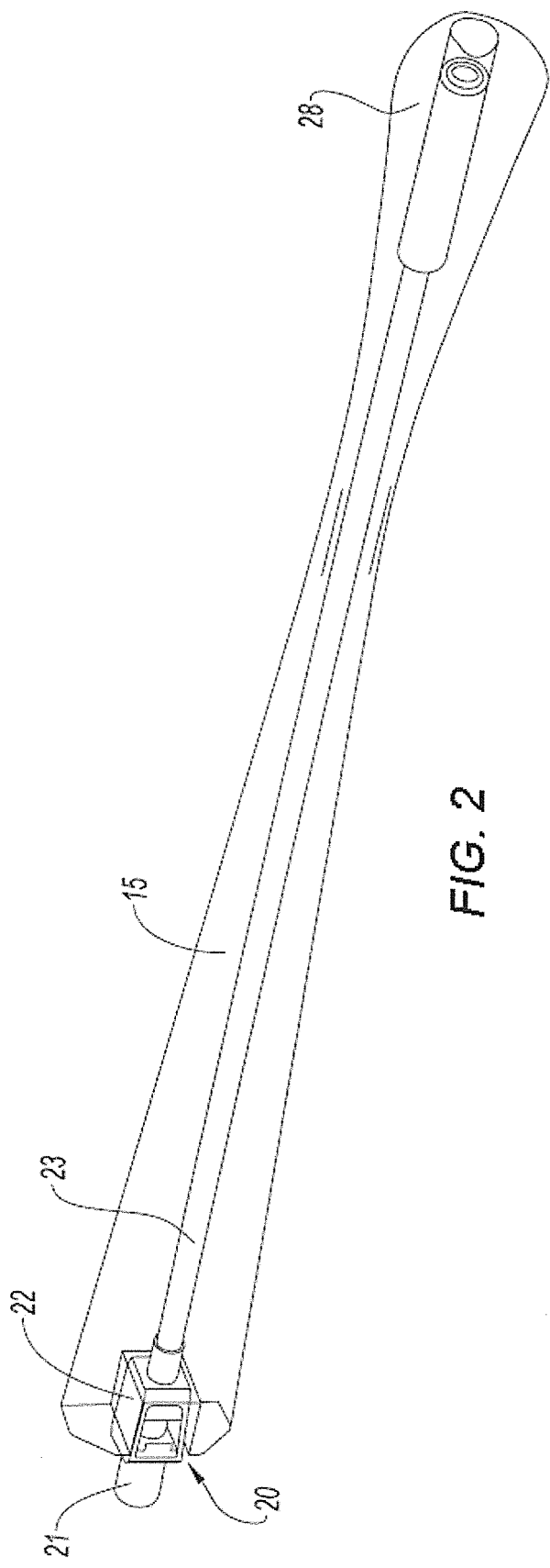
FIG. 2 is a view of a side of the frame of the invention as if it were transparent.
Figure 3:
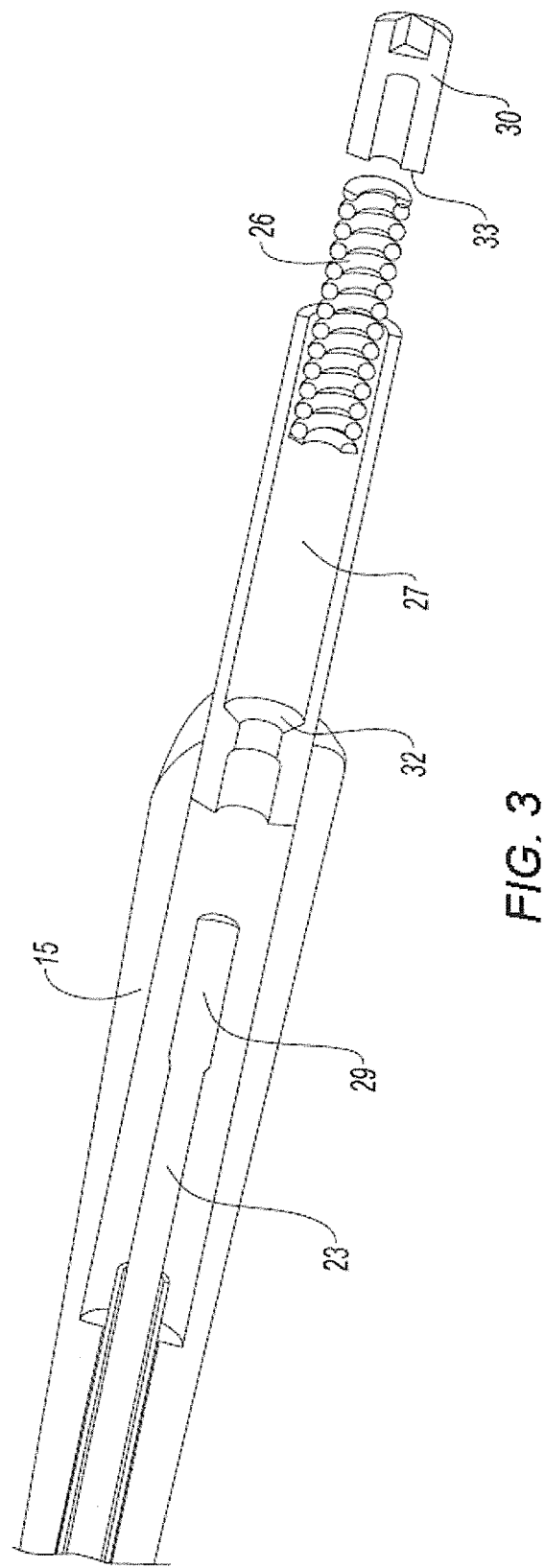
FIG. 3 is an exploded view of the end of the temple from FIG. 2.

Referring to FIG. 1, a classic prior art spectacle frame includes a frame front face 1 intended to receive lenses, generally optical lenses, and a right-hand side 2 and a left-hand side 3, in the example represented, the latter 2 folded against the rear of the frame front face 1 in the closed position and that 3, in the open position substantially perpendicular to the general plane of the frame front 1. The frame front 1 is extended laterally, substantially at a right angle, by two lateral frame front tenons 4, 5 to which the sides 2, 3 are articulated by means of two hinges 6, 7, here so-called telescopic hinges.

A telescopic hinge—for example the left-hand hinge 7—includes a frame front element 8, fastened to the frame front tenon 5, and a side element 9, fastened to the side 3, to be more precise, here, to the core 15 of this side on which it is formed.

The two hinge elements are articulated on an articulation pin 11 fastened to the frame front element 8.

The hinges 6, 7 of the two sides 2, 3 are identical.

This having been made clear, the sides of the frame of the invention will now be described, which are otherwise classic.

The two sides are always identical.

One side 15 is articulated, at one end, to a lateral tenon of the frame front face via a hinge 20, also called a telescopic hinge, including a frame front element 21, fastened to the tenon, and a side element 22 fastened to the side 15 including a slide 23 articulated on the frame front element 21 about an articulation pin 24 and slidably mounted in a sheath 25 formed in the side 15, which is therefore tubular.

The slide moves in the sheath 25 against and subject to the action of a spring 26 disposed at the other end 28 of the side, called the free end, in an enlarged portion 27 of the sheath 25.

The end 29 of the slide 23 is externally threaded and screwed into an internally threaded sleeve 30 blocking the sheath 25, 27 that extends as far as the edge of the side end 28 blocked by an embellisher plug 31.

Generally speaking, it may be said that the side end 28 is open and that it is blocked by the sleeve 30. This sleeve 30 is removable and thus enables an appropriate spring 26 adapted to the intended usage to be fitted as a function of its force. Being accessible, the spring 26 can be replaced. The spring 26, which is a compression spring, is thus accommodated in the enlarged part 27 of the sheath 25 bearing at both its ends on the bottom 32 of this enlarged, on the one hand, and on the inward facing end face 33 of the sleeve 30.

On side closing or over-opening pivoting, the slide 23 is drawn inside the sheath 25 in the direction of the free end 28 of the side toward the hinge 20. As it moves, the slide 23 draws with it the sleeve 30, which compresses the spring 26.

In the rest state, with the side closed or open, the spring 26 is relaxed, after sliding of the slide 23 in the other direction by virtue of the action of the spring 26.

It will be noted that the end 34 of the slide 23 disposed inside the hinge has a hook or eyelet shape so as to be able to turn about the articulation pin 24.

The invention claimed is:

1. A spectacle frame comprising:
   a frame front face extended by two lateral tenons;
   two sides articulated to said lateral tenons about articulation pins of two telescopic hinges;
   a frame front element fastened to one of said lateral tenons and a side element fastened to one of the sides, the side element of one of the two telescopic hinges including a slide articulated to the frame front element and slidably mounted in a sheath against and subject to the action of a spring;
   wherein the slide of the side element extends as far as a free end of one of the sides; and
   wherein a sleeve, fixed to an end of the slide is slidably mounted in said free end of one of the sides in which said spring also extends to cooperate with the sleeve.

2. The spectacle frame as claimed in claim 1, wherein said free end is blocked by said sleeve which is removable, said spring being inside said free end of one of the sides.

3. The spectacle frame as claimed in claim 2, wherein said free end of the slide is externally threaded and said sleeve is internally threaded and screwed to the slide.

4. The spectacle frame of claim 1, wherein said sheath in each of the sides includes, at said end of each of the sides, an enlarged portion in which said spring extends and having a bottom on which said spring bears.

5. A spectacle frame comprising:
   a frame front face, said frame front face being extended laterally by a first lateral tenon and a second lateral tenon;
   a first side comprising a first sheath disposed in an interior thereof and a second side comprising a second sheath disposed in an interior thereof;
   a first telescopic hinge comprising a first frame front element, a first side element comprising a first slide extending as far as a free end of the first side and slidably mounted in the first sheath and subject to a biasing force of a first spring and articulated to said first frame front element around a first articulation pin;
   a second telescopic hinge comprising a second frame front element, a second side element comprising a second slide extending as far as a free end of the second side and slidably mounted in the second sheath and subject to a biasing force of a second spring and articulated to said second frame front element around a second articulation pin;
   wherein the first side and the second side are articulated respectively to the first lateral tenon and the second lateral tenon by the first telescopic hinge and the second telescopic hinge respectively about said first articulation pin and said second articulation pin, said first frame front element and said second frame front element being fastened to the first lateral tenon and second lateral tenon respectively and said first side element and second side element fastened respectively to the first side and second side; and
   wherein a first sleeve and a second sleeve, fixed respectively to an end of the first slide and an end of the second slide, are slidably mounted respectively in said free end of the first side and said free end of the second side, and the first spring and the second spring extend respectively in said free end of the first side and second side to cooperate with said first sleeve and second sleeve.

6. The spectacle frame of claim 5, wherein said free ends of the first side and said second side are blocked respectively by the first sleeve and the second sleeve, said first spring and said second spring are inside said free ends of the first side and the second side, respectively, and wherein the first sleeve and the second sleeve are removable.

7. The spectacle frame of claim 6, wherein said ends of the first slide and the second slide are externally threaded and said first sleeve and said second sleeve are internally threaded and screwed to said first slide and said second slide, respectively.

8. The spectacle frame of claim 5, wherein said first sheath and said second sheath in the first and second sides include, respectively, at said free ends of the first free side and the second free side, an enlarged portion in which said first spring and second spring extend and having a bottom on which said first spring and said second spring bear.

* * * * *